United States Patent
Dezaki et al.

(10) Patent No.: US 10,155,162 B2
(45) Date of Patent: Dec. 18, 2018

(54) GAME SYSTEM FOR GAME STAGE MANAGEMENT

(75) Inventors: Tobuto Dezaki, Higashiosaka (JP); Yoshitake Suzuki, Osaka (JP)

(73) Assignee: CAPCOM CO., LTD., Osaka-shi, Osaka (JP)

( * ) Notice: Subject to any disclaimer, the term of this patent is extended or adjusted under 35 U.S.C. 154(b) by 1119 days.

(21) Appl. No.: 13/985,572

(22) PCT Filed: Feb. 15, 2012

(86) PCT No.: PCT/JP2012/000984
§ 371 (c)(1),
(2), (4) Date: Oct. 4, 2013

(87) PCT Pub. No.: WO2012/111322
PCT Pub. Date: Aug. 23, 2012

(65) Prior Publication Data
US 2014/0031112 A1    Jan. 30, 2014

(30) Foreign Application Priority Data
Feb. 15, 2011    (JP) ................................. 2011-030064

(51) Int. Cl.
*A63F 13/63* (2014.01)
*A63F 13/35* (2014.01)
(Continued)

(52) U.S. Cl.
CPC .............. *A63F 13/35* (2014.09); *A63F 13/12* (2013.01); *A63F 13/30* (2014.09); *A63F 13/40* (2014.09);
(Continued)

(58) Field of Classification Search
CPC .......... A63F 13/00; A63F 13/12; A63F 13/30; A63F 13/60; A63F 13/63; A63F 13/73; A63F 13/85
(Continued)

(56) References Cited

U.S. PATENT DOCUMENTS

| | | | |
|---|---|---|---|
| 2005/0144251 A1* | 6/2005 | Slate ....................... | H04L 29/06 709/215 |
| 2006/0189382 A1* | 8/2006 | Muir ....................... | G07F 17/32 463/29 |

(Continued)

FOREIGN PATENT DOCUMENTS

| | | |
|---|---|---|
| JP | 2009233104 A | 10/2009 |
| JP | 2010172656 A | 8/2010 |

OTHER PUBLICATIONS

Sony Computer Entertainment, Inc., "Infinite Corridor Box of Light and Shadow Software Manual", Jan. 12, 2011, pp. 16-25.
(Continued)

*Primary Examiner* — William H McCulloch, Jr.
*Assistant Examiner* — Chase Leichliter
(74) *Attorney, Agent, or Firm* — Alleman Hall Creasman & Tuttle LLP

(57) ABSTRACT

Provided is a game system which can suppress flooding of game stages which cannot be cleared, while suppressing a limitation on occasions in which another user(s) play(s) a game stage created by a particular user. The game system includes a game stage creating section for creating a game stage in response to a user's manipulation; an uncleared game stage management section for managing the game stage as an uncleared game stage; a play executing section for executing test play of the uncleared game stage; and a cleared game stage management section for managing the uncleared game stage having been cleared in test play as a cleared game stage.

9 Claims, 9 Drawing Sheets

(51) Int. Cl.
  *A63F 13/77*  (2014.01)
  *A63F 13/60*  (2014.01)
  *A63F 13/40*  (2014.01)
  *A63F 13/30*  (2014.01)
  *A63F 13/85*  (2014.01)
  *A63F 13/73*  (2014.01)

(52) U.S. Cl.
  CPC .............. *A63F 13/60* (2014.09); *A63F 13/63* (2014.09); *A63F 13/77* (2014.09); *A63F 13/73* (2014.09); *A63F 13/85* (2014.09); *A63F 2300/558* (2013.01); *A63F 2300/6018* (2013.01); *A63F 2300/636* (2013.01)

(58) Field of Classification Search
  USPC .......................................... 463/1, 29, 42, 43
  See application file for complete search history.

(56) References Cited

U.S. PATENT DOCUMENTS

| | | | | |
|---|---|---|---|---|
| 2007/0021198 A1* | 1/2007 | Muir | .................. | G07F 17/32 463/29 |
| 2008/0078758 A1* | 4/2008 | Shimura | ................. | A63F 13/10 219/717 |
| 2009/0063590 A1* | 3/2009 | Yuval | ................ | G06F 17/30905 |
| 2009/0149246 A1* | 6/2009 | Opaluch | ................. | A63F 13/79 463/29 |
| 2009/0253506 A1* | 10/2009 | Ishii | ........................ | A63F 13/10 463/31 |
| 2009/0253507 A1* | 10/2009 | Ishii | ........................ | A63F 13/12 463/32 |
| 2009/0253517 A1* | 10/2009 | Bererton | ................. | A63F 13/12 463/42 |
| 2010/0197389 A1* | 8/2010 | Ueda | ...................... | A63F 13/12 463/30 |
| 2010/0240461 A1* | 9/2010 | Rasmussen | ........... | G06Q 10/10 463/43 |
| 2012/0324385 A1* | 12/2012 | Johnston | ................ | G06T 11/60 715/765 |
| 2015/0317155 A1* | 11/2015 | Grills | ..................... | A63F 13/60 717/121 |

OTHER PUBLICATIONS

Asterizm Co., Ltd., "Death Village", Retrieved at <http://nigoro.jp/game/deathvillage/editor.html>, Searched on Jan. 31, 2011, 4 pp.

Japanese Patent Office, International Search Report of PCT/JP2012/000984, WIPO, Apr. 3, 2012, 2 pages.

* cited by examiner

GAME SYSTEM FOR GAME STAGE MANAGEMENT

TECHNICAL FIELD

The present invention relates to a game system, a computer device, a control method of the computer device, and a storage medium, which allow another user(s) to play a game stage created by a particular user.

BACKGROUND ART

Conventionally, there is known a game system, in which a game device owned by a user is connected to a server device via a communication line such as Internet, and a game content downloaded from the server device can be played. As one aspect which utilizes such a game system, there is also known a game system in which a particular user can upload a game stage of a certain game content to a server device, and another user(s) can download this game stage from the server device and play this game stage. In the case of this game system, the particular user creates a game stage with a higher challenge (difficulty) level or with a more elaborate content than that of a game stage prepared in advance, and another user(s) can play this game stage. Therefore, there are a variety of game contents, and games enjoyed by many users can be realized.

However, if the game stage created by the user can be uploaded to the server device unconditionally, disadvantageous situations may take place. For example, the game stage created by the user cannot be always cleared, different from game stages created by experts of development of games. Therefore, storage of the server device may possibly be flooded with game stages which cannot actually be cleared. Such a situation is not favorable to users who wish to play game stages which can be fundamentally cleared. In addition, cases of uploading to the server device significantly increase in number in a short time period, and may possibly go over the capacity of the server device.

Under the circumstances, Patent Literature 1 discloses a means which is able to solve the above stated problems that the game stages which cannot actually be cleared are left in the server device, or they go over the capacity of the server device in a short time. Specifically, Patent Literature 1 discloses that a user can create a game stage freely but can upload the game stage created by the user to a server device only after the user has cleared the game stage. As a result, only the game stage guaranteed as that which can be cleared is uploaded to the server device and another user(s) can play it. This makes it possible to prevent situations in which the game stages which cannot actually be cleared are left in the server device, or they go over the capacity of the server device in a short time period.

Patent Literature 1 specifically discloses a "TEST button" as a means which allows a user to play a game stage created by the user. Regarding the "TEST button," it is described that the "TEST button; execute test play of created stage. When test play is cleared, upload stage data. Click UPLOAD button displayed when the test play has been cleared and input a name of a user who created the game stage and a pass word for deleting data for the purpose of uploading."

CITATION LIST

Patent Literature
Non-Patent Literature 1: "Death Village", [online], ASTER-IZM Co., Ltd. [searched on Jan. 31, 2011] Internet <http://nigorojp/game/deathvillage/editor.html>

SUMMARY OF INVENTION

Technical Problem

In a case where the means disclosed in Patent Literature 1 is employed, a problem different from those described above may arise. This will be described specifically. Even when the game stage created by the particular user can be fundamentally cleared, the particular user cannot clear the game stage because of a low level of the particular user's skill, in some cases. Or, in other cases, because of influences of specification of the game device used by the particular user, or a play environment (e.g., communication environment between the game device and the server device), the particular user cannot clear the game stage. In a case where the means disclosed in Patent Literature 1 is employed, because the particular user cannot clear the game stage for the above stated reasons even though the game stage can be fundamentally cleared, a situation in which the game stage cannot be uploaded to the server device, may take place. In this case, features of this kind of game, in which the particular user creates a game stage with a higher challenge (difficulty) level or with a more elaborate content, and another user(s) can play this game stage, cannot be effectively utilized.

The game in which the game stage created by the particular user can be played by another user(s) may be a community tool between users. However, it cannot be said that a function of the community tool is adequately performed under the above circumstances. For this reason, at present, moods of users who play this kind of game cannot be enhanced well.

Accordingly, an object of the present invention is to provide a game system, a computer device, a control method of the computer device, and a storage medium, which can suppress disadvantageous situations to users because of the flooding of game stages which cannot be cleared while suppressing a limitation on occasions in which another user(s) play(s) the game stage created by the particular user, and allows the function of the community tool between the users to be adequately performed.

Solution to Problem

According to the present invention, there is provided a game system including a plurality of computer devices which are communicable with each other via a communication means, the game system comprising: a game stage creating module (game stage creating means) for creating a game stage in response to a user's manipulation; an uncleared game stage management module (uncleared game stage management means) for managing the created game stage as an uncleared game stage which is not guaranteed as a game stage which can be cleared; a test play executing module (test play executing means) for executing test play of the uncleared game stage in response to the user's manipulation; and a cleared game stage management module (cleared game stage management means) for managing the uncleared game stage having been cleared in the test play as a cleared game stage which is guaranteed as a game stage which can be cleared.

In accordance with this configuration, the game stage created by a particular user can be managed as the uncleared game stage, and another user can play this game stage. In other words, even when the game stage created by the particular user has not been cleared by the particular user, this game stage is managed as the uncleared game stage.

Therefore, it becomes possible to suppress a situation in which occasions in which another user(s) play(s) this game stage are limited. After any user clears the uncleared game stage in test play thereafter, this game stage is managed as the cleared game stage. This allows the user to select which of the uncleared game stage and the cleared game stage is played. As a result, it becomes possible to prevent disadvantages to the user due to presence of the uncleared game stage.

(2) The game system may further comprise a clear state information providing module (clear state information providing means) for providing the game stage with clear state information indicating whether or not the game stage has been cleared by a user who created the game stage before the game stage is managed by the uncleared game stage management module or the cleared game stage management module; wherein the uncleared game stage management module may manage the game stage as the uncleared game stage when the clear state information indicates that the game stage is uncleared; and wherein the cleared game stage management module may manage the game stage as the cleared game stage when the clear state information indicates that the game stage has been cleared.

In accordance with this configuration, if the user who created the game stage cannot clear this game stage as a result of play executed in advance, this game stage is managed as the uncleared game stage. On the other hand, if the user can clear the game stage, this game stage can be managed as the cleared game stage from the beginning. The clear state information provided to the game stage may be implemented by, for example, status flag set in association with the game stage. The flag is set to OFF for the uncleared game stage, while the flag is set to ON for the cleared game stage. This makes it possible to distinguish the cleared game stage and the uncleared game stage from each other.

(3) The game system may further comprise a ranking management module (ranking management means) for managing ranking of the game stage according to a use state of the game stage; wherein the ranking management module may be configured to rank the cleared game stage among game stages.

This urges the user who is going to create the game stage to create the game stage which can be cleared, which will become a ranking target. As a result, it becomes possible to prevent a situation in which the flooding of numerous uncleared game stages occurs. As an indicator of ranking, the number of times the cleared game stage is downloaded to a terminal (game device) of each user, the number of times the game stage is played actually and cleared, etc., may be used.

(4) The uncleared game stage management module may be configured to terminate management of the uncleared game stage when a predetermined condition is satisfied in a state in which the uncleared game stage remains uncleared.

In accordance with this configuration, a problematic (inferior) game stage which cannot be cleared by any user is deleted. Therefore, it becomes possible to prevent a situation in which the user plays such a bad game stage and as a result, feels stress. In addition, the number of game stages to be managed (stored) can be limited, and a storage capacity can be reduced.

(5) The game system may further comprise a reward providing module (reward providing means) for providing a predetermined reward to a user who has cleared the uncleared game stage in test play.

This urges the user to try to execute test play of the uncleared game stage. As a result, the game stage which can be fundamentally cleared and is regarded as the uncleared game stage can be changed into the cleared game stage, which increases in number, and occasions in which each user plays the game stage can be increased. As a reward, there may be, for example, money which can be used to buy items and protective guard, etc., in the middle of the game, articles in the game such as items and protective guard, honor given to the user, etc.

(6) According to the present invention, there is provided a computer device comprising: a communication module (communication means) for transmitting/receiving data to/from another computer device; an uncleared game stage management module (uncleared game stage management means) for managing a created game stage as an uncleared game stage which is not guaranteed as a game stage which can be cleared, when the created game stage is received from the another computer device via the communication module; and a cleared game stage management module (cleared game stage management means) for managing an uncleared game stage as a cleared game stage which is guaranteed as a game stage which can be cleared, when clear achievement information indicating that the uncleared game stage has been cleared is received from the another computer device via the communication module.

(7) When the game stage is received from the other computer device, the uncleared game stage management module may manage the game stage provided with the clear state information indicating that the game stage is uncleared, as the uncleared game stage; and the cleared game stage management module may manage the game stage provided with the clear state information indicating that the game stage has been cleared, as the cleared game stage.

(8) The computer device may further comprise a ranking management module (ranking management means) for ranking the game stage according to a use state of the game stage; wherein the ranking management module may be configured to rank the cleared game stage among game stages.

(9) The uncleared game stage management module may be configured to terminate management of the uncleared game stage when a predetermined condition is satisfied in a state in which the uncleared game stage remains uncleared.

(10) The computer device may further comprise a reward providing module (reward providing means) for providing a predetermined reward to a user who has cleared the uncleared game stage in test play.

(11) According to the present invention, there is provided a computer device comprising: a game stage creating module (game stage creating means) for creating a game stage in response to a user's manipulation; a communication module (communication means) for transmitting/receiving data including the game stage to/from another computer device; a game stage selecting module (game stage selecting means) for selecting test play of an uncleared game stage which is not guaranteed as a game stage which can be cleared, or selecting play of a cleared game stage which is guaranteed as a game stage which can be cleared, in response to the user's manipulation; and a play executing module (play executing means) which receives the selected game stage from the other computer device and executes the selected game stage.

(12) The computer device may further comprise: a clear state information providing module (clear state information providing means) for providing a game stage created by the computer device with clear state information indicating whether or not the game stage has been cleared, when the game stage is transmitted to the other computer device.

(13) The computer device may be configured to transmit clear achievement information to the other computer device via the communication module when the play executing module has cleared the uncleared game stage in test play.

According to the present invention, there is provided a method of controlling a computer device, comprising the steps of: transmitting/receiving data to/from another computer device; managing a created game stage as an uncleared game stage which is not guaranteed as a game stage which can be cleared, when the created game stage is received from the other computer device; and managing an uncleared game stage as a cleared game stage which is guaranteed as a game stage which can be cleared, when clear achievement information indicating that the uncleared game stage has been cleared is received from the other computer device. According to the present invention, there is provided a storage medium which is computer-device-readable, and contains commands executed by a control section in the computer device, the commands causing the computer device to execute the steps of: transmitting/receiving data to/from another computer device; managing a created game stage as an uncleared game stage which is not guaranteed as a game stage which can be cleared, when the created game stage is received from the other computer device; and managing an uncleared game stage as a cleared game stage which is guaranteed as a game stage which can be cleared, when clear achievement information indicating that the uncleared game stage has been cleared is received from the other computer device.

Advantageous Effects of Invention

In accordance with the present invention, it is possible to provide a game system, a computer device, a control method of the computer device, and a storage medium, which can suppress disadvantageous situations to users because of flooding of game stages which cannot be cleared while suppressing a limitation on occasions in which another user(s) play(s) the game stage created by the particular user.

DESCRIPTION OF EMBODIMENTS

Hereinafter, a game system, a computer device, a control method of the computer device, and a storage medium, according to embodiments of the present invention will be described with reference to the drawings.

Embodiment 1

[Content of Game]

Figure 1:
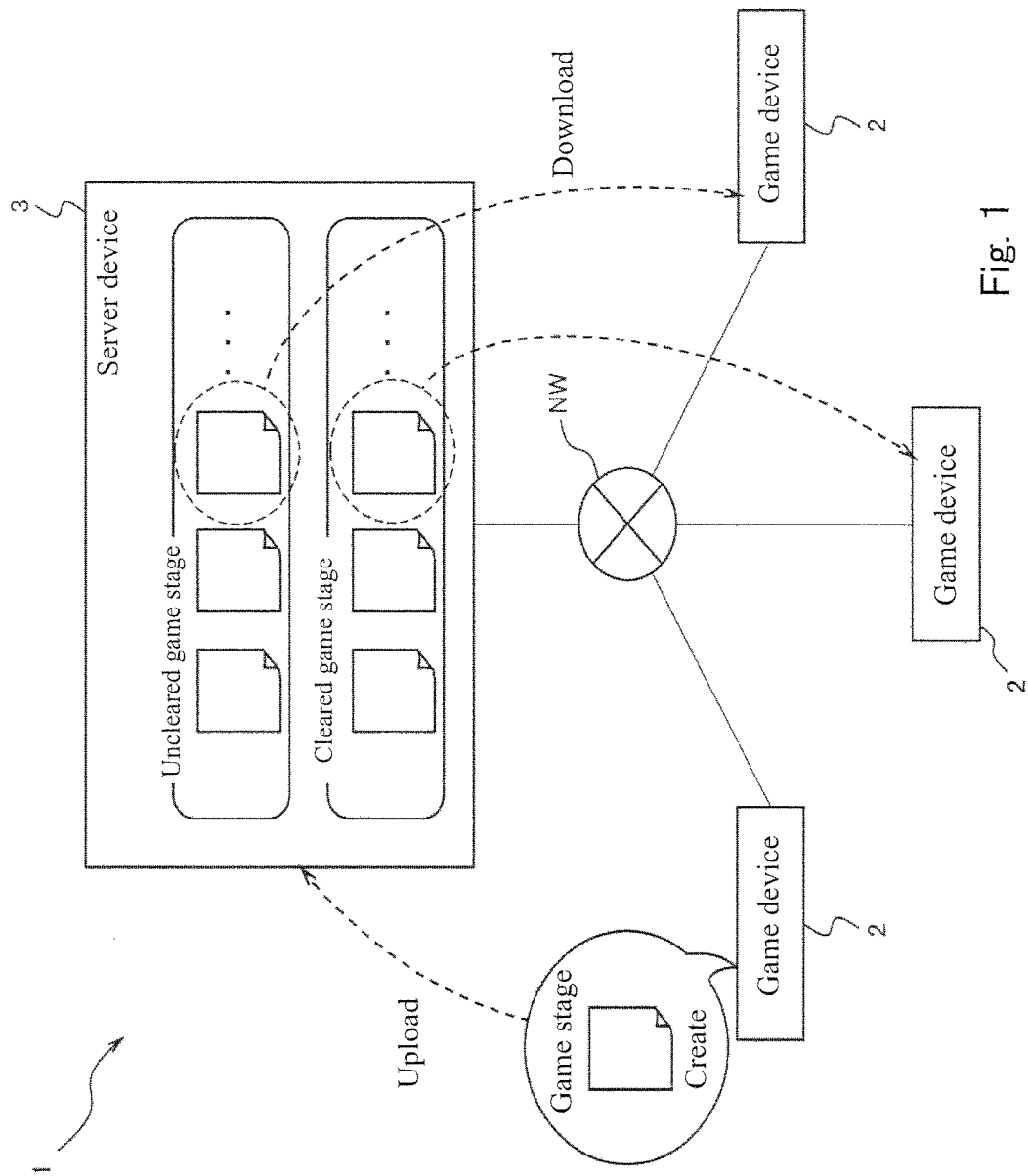
FIG. 1 is a schematic view showing an outline of a game according to an embodiment of the present invention.

FIG. 1 is a schematic view showing an outline of a game which can be implemented by a game system according to an embodiment of the present invention. This game system can be implemented by a computer device according to the embodiment of the present invention as will be described below, or by executing game programs which are commands stored in a storage medium according to the embodiment of the present invention, in the computer device. As shown in FIG. 1, a game system 1 according to the present embodiment includes game devices (computer devices) 2 and a server device 3 which are connected to each other via a communication network NW. A user (player) manipulates the game device 2 to play the game stored in the game device 2. In the present embodiment, an action game will be exemplarily described, in which the user manipulates a player character within a created game stage to guide the play character from a start point to a goal point while defeating enemy characters in the middle.

As shown in FIG. 1, in this game system 1, the user can create the game stage using the game device 2 and transmit (upload) the created game stage to the server device 3. In other words, in the game system 1, the user can download the game stage created by the user in addition to the game stage created by a game producer in advance, from the server device 3, and play the game stage.

Figure 2:
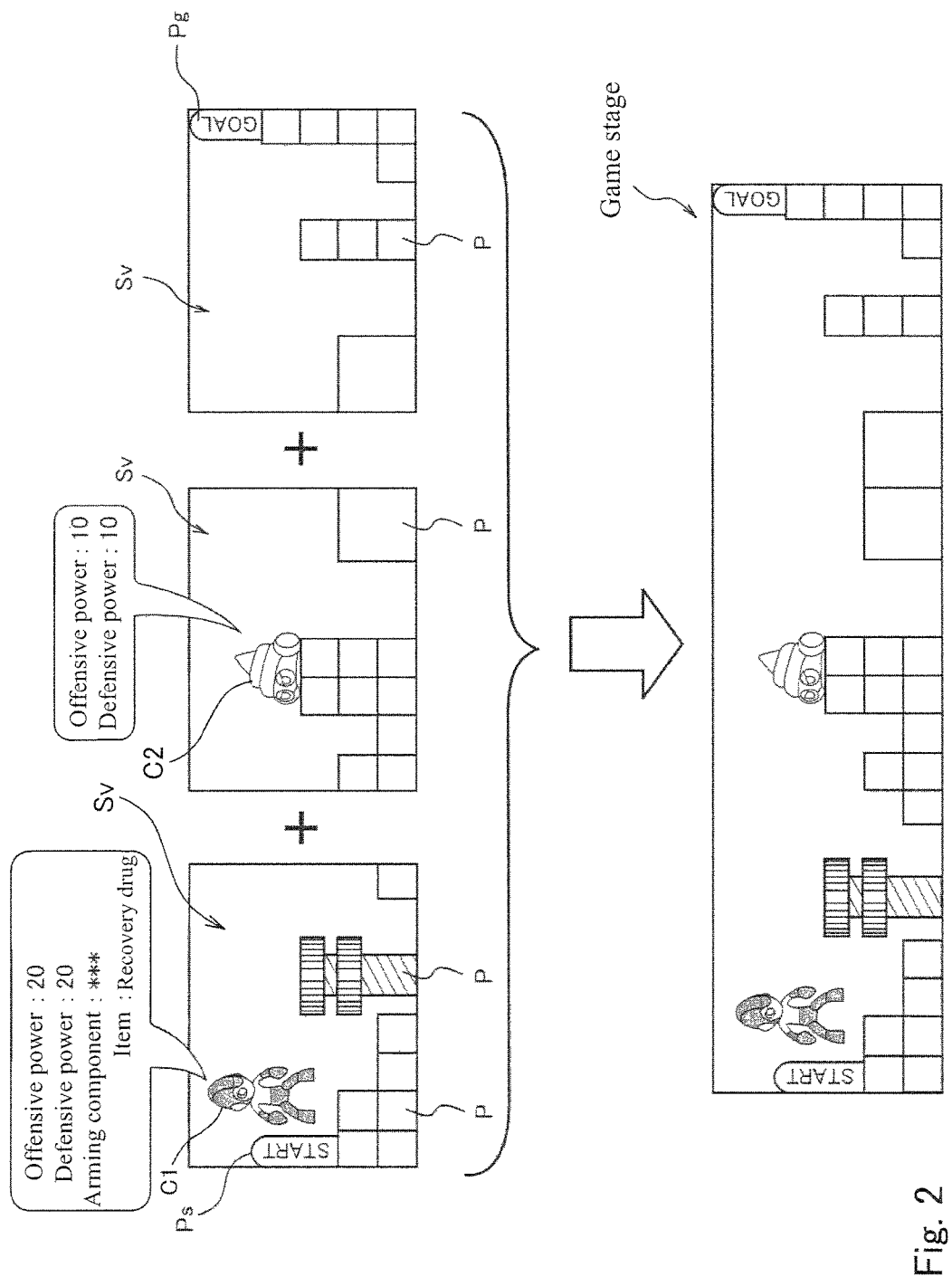
FIG. 2 is a schematic view showing how to create a game stage.

FIG. 2 is a schematic view showing how to create the game stage, which is performed by the user. As shown in FIG. 2, when the game stage is created, the user lays out object parts P and an enemy character C2 in a virtual game space Sv, for each scene which can be displayed at a time on a monitor of the game device 2. Then, by connecting a plurality of virtual game spaces Sv of the scenes to each other, the user can create the game stage having a sequence.

When the game stage is created, a status of the player character C1 which is manipulated by the user during the play, a status and position of the enemy character C2, etc., can be set. For example, as the status of the player character C1, a numeric value indicating an offensive power and a numeric value indicating a defensive power can be decided as desired within preset ranges. Furthermore, initial arming components (weapon, protective guard, etc.) of the player character C1, and items (recovery drug, etc.) owned by the player character C1 can be set. Likewise, as the status of the enemy character C2, a numeric value indicating an offensive power, a numeric value indicating a defensive power, etc., can be decided as desired within preset ranges.

It is an indispensable condition that a start point Ps and a goal point Pg are set, in the game stage. The start point Ps refers to a place where the player character C1 appears for the first time within the game stage, while the goal point Pg refers to a place where the player character C1 reaches and thereby the game stage is assumed as having been cleared.

As shown in FIG. 1, the game stage created as described above can be uploaded from the particular game device 2 to the server device 3 via the communication network. The uploaded game stage is managed by the server device 3 and can be downloaded in response to a request from another game device 2. The user downloads the game stage from the server device 3 to the game device 2, and executes predetermined manipulation to play this game stage in the game device 2.

The server device 3 manages the game stages in such a manner that they are categorized into "uncleared game stage" which is not guaranteed as that which can be cleared and "cleared game stage" which is guaranteed as that which can be cleared. The user can select which of the uncleared game stage and the cleared game stage is going to be downloaded, by manipulation of the game device 2, and download and play the selected game stage.

[Hardware Configuration of Game System]

Figure 3:
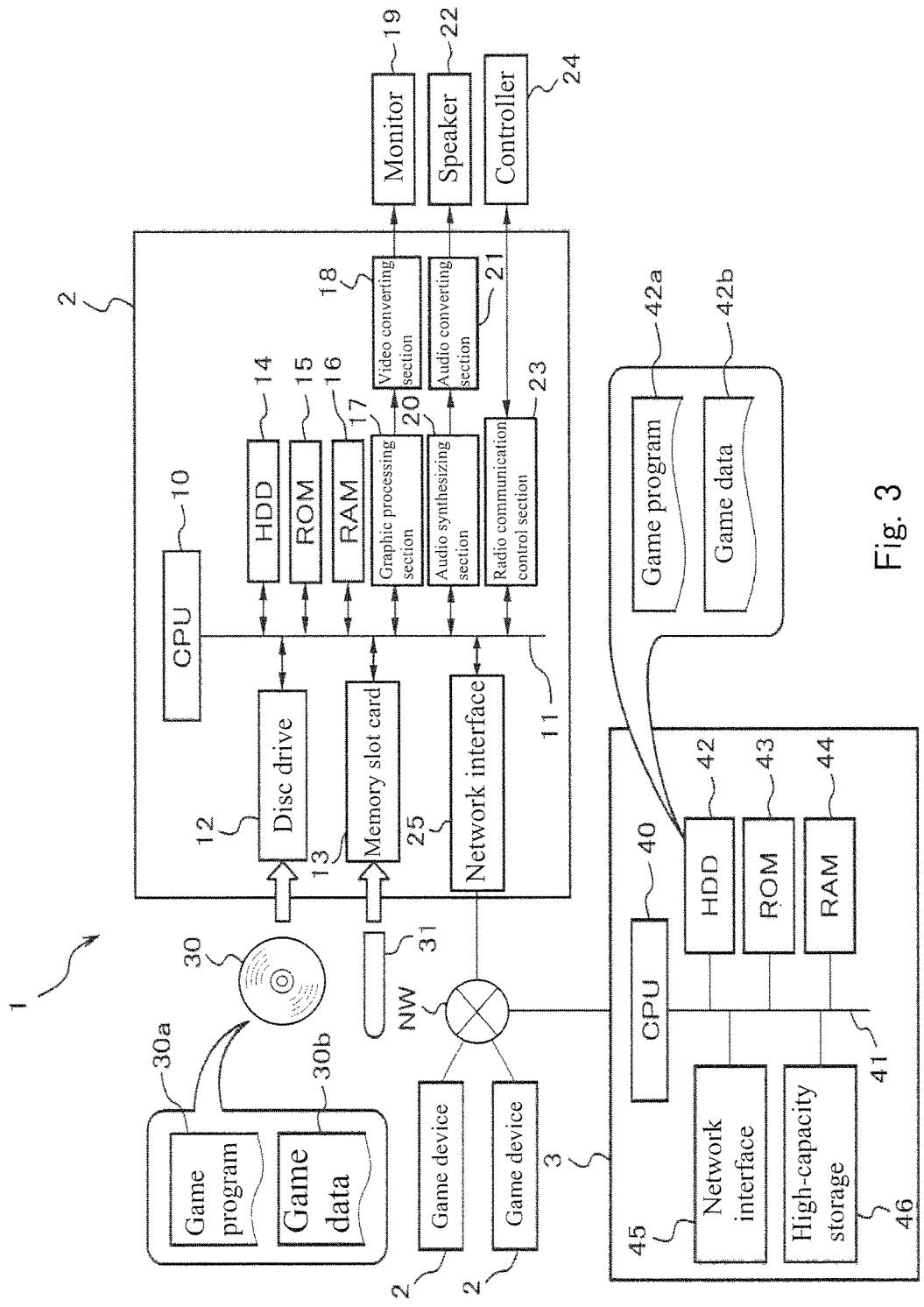
FIG. 3 is a block diagram showing a game system according to the present embodiment.

FIG. 3 is a block diagram showing a hardware configuration of the game system 1 according to the embodiment of the present invention. As described above, the game system 1 includes the plurality of game devices 2 which are computer devices, and the server device 3 which is another computer device such that the plurality of game devices 2 and the server device 3 are communicatively connected to each other via a communication network NW such as Internet or LAN. Each of the plurality of game devices 2 includes a CPU 10 for controlling an operation of the game device 2. The CPU 10 is connected to a disc drive 12, a memory card slot 13, an HDD 14, a ROM 15 and a RAM 16 via a bus 11.

The disc drive 12 is loaded with a disc-type storage medium 30 (storage medium according to the embodiment of the present invention) such as DVD-ROM. The disc-type storage medium 30 contains a game program (commands) 30a according to the embodiment of the present invention, and game data 30b such as characters appearing in the game, objects required to create the game stage, etc., as will be described in the present embodiment. The memory slot card 13 is loaded with a card-type storage medium 31 which is able to store save data indicating a play state such as a state in the middle of proceeding of the game, in response to a command from the CPU 10.

The HDD 14 is a high-capacity storage medium built into the game device 2. The HDD 14 is able to store the game program 30a and the game data 30b which are read-in from the disc-type storage medium 30, the save data, etc. The ROM 15 is a semiconductor memory such as a mask ROM or a PROM. The ROM 15 contains a start-up program which causes the game device 2 to start-up, a program for controlling an operation performed when the disc-type storage medium 30 is loaded, etc. The RAM 16 is composed of a DRAM, a SRAM, etc. The RAM 16 reads-in the game program 30a to be executed by the CPU 10, the game data 30b required in the execution of the game program 30a, etc., from the disc-type storage medium 30 or the HDD 14, according to the play state of the game, and temporarily stores them.

The CPU 10 is further connected to a graphic processing section 17, an audio synthesizing section 20, a radio communication control section 23, and a network interface 25 via the bus 11.

The graphic processing section 17 draws a game image including the virtual game space Sv, the characters C1 and C2, etc., in each scene of the game stage in accordance with the command from the CPU 10. The graphic processing section 17 is connected to an outside monitor 19 via a video converting section 18. The video converting section 18 converts the game image drawn by the graphic processing section 17 into a motion picture format, which is displayed on the monitor 19.

The audio synthesizing section 20 reproduces and synthesizes a digital game sound in accordance with the command from the CPU 10. An outside speaker 22 is connected to the audio synthesizing section 20 via an audio converting section 21. Therefore, the audio converting section 21 decodes the game sound reproduced and synthesized by the audio synthesizing section 20 into an analog format and then the speaker 22 outputs the game sound in the analog format to the outside.

The radio communication control section 23 has a radio communication module of 2.4 GHz band which is connected via radio (wirelessly) to a controller 24 belonging to the game device 2 and is able to transmit/receive data to/from the controller 24. The user manipulates a manipulandum (not shown) such as a button attached to the controller 24 to input a signal to the game device 2, thereby controlling motion of the player character C1 displayed on the monitor 19. The network interface 25 connects the particular game device 2 to the communication network NW such as Internet or LAN to allow the particular game device 2 to communicate with another game device 2 or the server device 3. In the state in which the particular game device 2 is connected to the another game device 2 via the communication network NW so that the data is transmitted/received between them, the player characters C1 can move in synchronization with each other within the same game stage. This enables multi-play in which the game is proceeded by several users together.

The server device 3 includes a high-performance CPU 40 for controlling an operation of the server device 3. The CPU 40 is connected to an HDD 42, a ROM 43, a RAM 44, a network interface 45, and a high-capacity storage 46 via a high-speed bus 41.

The HDD 42 is a high-capacity storage medium built into the server device 3. The HDD 42 contains a game program 42a and game data 42b which are different from those of the game device 2. The ROM 43 is a semiconductor memory such as a mask ROM or a PROM. The ROM 43 contains a basic program for implementing a basic operation of the server device 3, such as a program for controlling communication between the server device 3 and another game device 2. The RAM 44 is composed of a DRAM, a SRAM, etc. The RAM 44 reads-in a game program 42a to be executed by the CPU 40, the game data 42b required in the execution of the game program 42a, etc., from the HDD 42, or the like, according to the play state of the game, and temporarily stores them.

The network interface 45 connects the server device 3 to the communication network NW such as Internet or LAN to allow the server device 3 to communicate with the game devices 2 by a client/server method. The high-capacity storage 46 is a high-capacity HDD for the server. As will be described later, the high-capacity storage 46 is able to store the game data relating to the game stage, etc., uploaded from the game device 2.

Although the disc-type storage medium 30 is exemplarily described above as the storage medium of the present invention, the present invention is not limited to this and the storage medium of the present invention may be the card-type storage medium 31, or another storage medium. Furthermore, the storage medium may be configured to store the commands used to cause the game device 2 to perform functions described below and is not limited to the outside storage medium removably inserted into the game device 2. For example, in a case where the server device 3 connected to the communication network NW contains the commands and a computer device which downloads the commands from the server device 3 is the game device of the present invention, the server device 3 corresponds to the storage medium of the present invention. That is, any computer device which contains the commands as downloaded contents corresponds to the storage medium of the present invention. Moreover, a hard disc built into the computer device may become the storage medium of the present invention, or application (program) downloaded from the server device may become the storage medium of the present invention.

[Functional Configuration of Game System]

Figure 4:
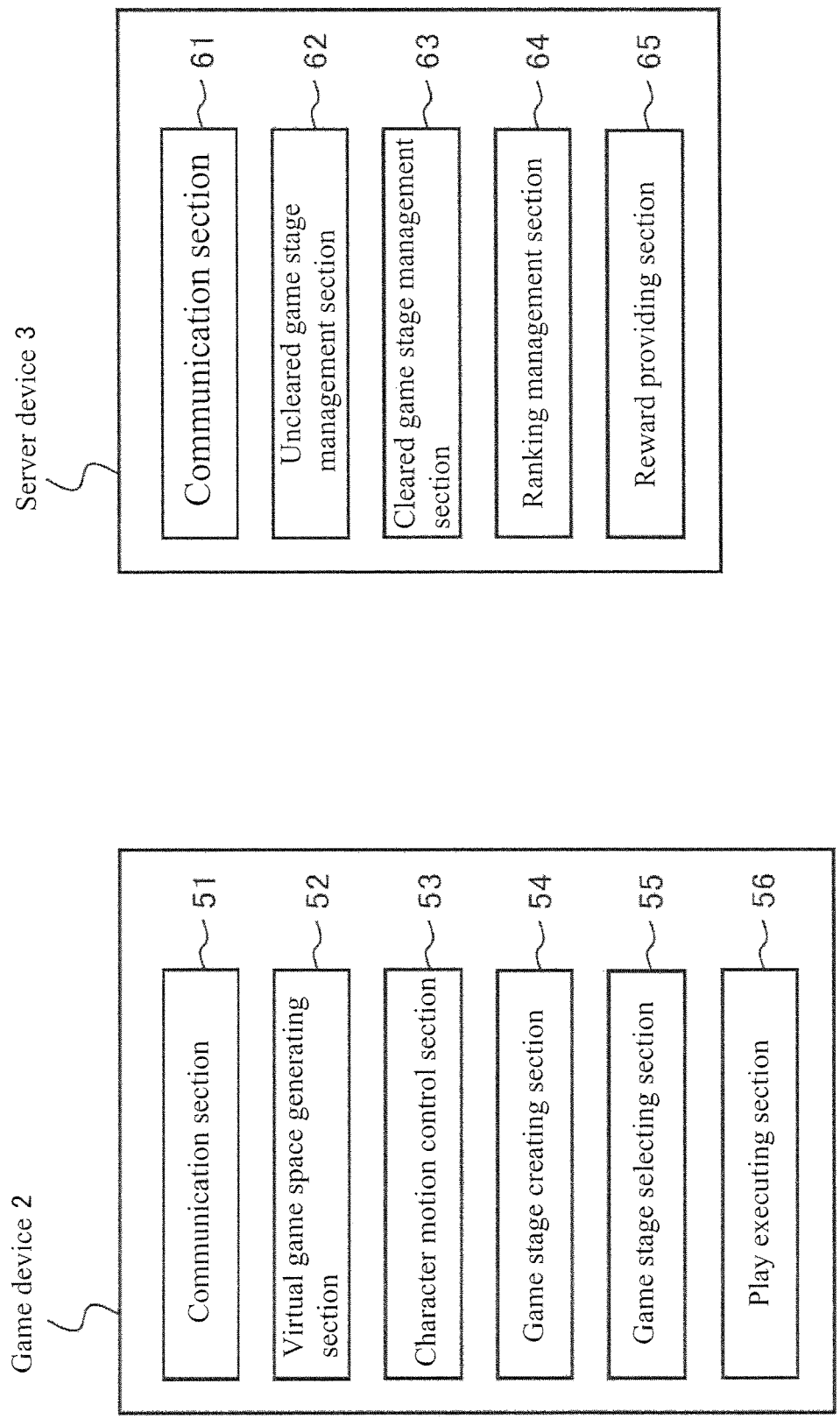
FIG. 4 is a block diagram showing a functional configuration of a game device and a functional configuration of a server device.

FIG. 4 is a block diagram showing a functional configuration of the above stated game device 2 and a functional configuration of the above stated server device 3. As shown in FIG. 4, the game device 2 includes a communication section (communication module, communication means) 51, a virtual game space generating section (virtual game space generating module, virtual game space generating means) 52, a character motion control section (character motion control module, character motion control means) 53, a game stage creating section (game stage creating module, game stage creating means) 54, a game stage selecting section (game stage selecting module, game stage selecting means) 55, a play executing section (play executing module, play executing means) 56, etc. The sections 51 to 56 implement the functions as described below, respectively. Specifically, the functions are configured as the CPU 10, the HDD 14, the ROM 15, the RAM 16, the graphic processing section 17, the video converting section 18, the audio synthesizing section 20, the audio converting section 21, the network interface 25, etc., shown in FIG. 3.

The communication section 51 transmits/receives data to/from another game device 2 or the server device 3 via the communication network NW. For example, the communication section 51 is able to upload the game stage (data relating to the game stage) created by the game device 2 to the server device 3 in response to the user's manipulation, and download the game stage managed by the server device 3 to the game device 2.

The virtual game space generating section 52 generates the game stage and the characters as described above, which are to be displayed on the monitor 19. That is, the virtual game space generating section 52 generates the virtual game space Sv in which the player character C1 acts in the game stage, the object parts P laid out in the virtual game space Sv and forming the game stage, the characters C1 and C2 acting in the game stage, etc., which can be displayed on the monitor 19.

The character motion control section 53 controls the motions of the characters in the game stage in response to the user's manipulation of the controller 24 or according to the state of proceeding of the game. For example, the user manipulates the controller 24 to cause the player character C1 to move within the game stage, or cause the player character C1 to attack the enemy character C2. The character motion control section 53 controls the motions of the characters in such a manner that at a time point when the player character C1 passes a predetermined point within the game stage, this becomes a trigger, and a particular enemy character C2 is caused to appear within the game stage and to attempt to attack the player character C1.

The game stage creating section 54 creates the game stage in the virtual game space Sv in response to the user's manipulation of the controller 24. That is, as described with reference to FIG. 2, the game stage creating section 54 creates the game stage in such a manner that the object parts P are laid out in the virtual game space Sv, the start point Ps and the goal point Pg are set, the status of the player character C1 is set, the status and appearance position of the enemy character C2 are set, etc. The created game stage is affixed with unique ID information (ID) and stored in the HDD 14. In addition, in response to the user's manipulation, the communication section 51 uploads the created game stage to the server device 3 together with the ID information. As will be described later, the server device 3 stores and manages the uploaded game stage, as "uncleared game stage" distinguished from "cleared game stage."

The game stage selecting section 55 selects which of the uncleared game stage and the cleared game stage is to be downloaded, from among the game stages managed by the server device 3. Specifically, when there is a request for browsing of the game stages from the game device 2 to the server device 3, the server device 3 provides list information of the game stages to the game device 2 such that the cleared game stages and the uncleared game stages are distinguished from each other. The game device 2 displays the list information. In response to the user's manipulation of the controller 24, the game device 2 accepts selection of one particular game stage from the list information of the game stages, and requests the server device 3 to download the selected game stage. The game stage selecting section 55 executes processing including the request for browsing of the game stages to the request for downloading of the game stage, in response to the user's manipulation.

The play executing section 56 executes play of the game stage pre-stored in the game device 2 in response to the user's manipulation, and executes play of the game stage downloaded from the server device 3 in response to the user's manipulation. Since the uncleared game stage is not guaranteed as that which can be cleared, the play of the uncleared game stage is regarded as "test play" by which it is determined whether or not the game stage can be cleared, in the present embodiment. Regardless of which of the uncleared game stage and the cleared game stage is played and cleared, "clear achievement information" is associated with the ID information of the cleared game stage and transmitted from the game device 2 to the server device 3.

The functions implemented by the communication section 51, the virtual game space generating section 52, the character motion control section 53, the game stage creating section 54, the game stage selecting section 55, the play executing section 56, etc., in the game device 2 as described above, constitute an example of steps of the control method of the game device 2 in execution of the present game. As corresponding to the sections 51 to 56, the steps may include a communication step, a virtual game space generating step, a character motion control step, a game stage creating step, a game stage selecting step, and a play executing step.

As shown in FIG. 4, the server device 3 includes a communication section (communication module, communication means) 61, an uncleared game stage management section (uncleared game stage management module, uncleared game stage management means) 62, a cleared game stage management section (cleared game stage management module, cleared game stage management means) 63, a ranking management section (ranking management module, ranking management means) 64, a reward providing section (reward providing module, reward providing means) 65, etc. The sections 61 to 65 are able to implement functions as described below. Specifically, the functions are configured as the CPU 40, the HDD 42, the ROM 43, the RAM 44, the network interface 45, the high-capacity storage 46, etc., as shown in FIG. 3.

The communication section 61 transmits/receives data to/from the plurality of game devices 2 via the communication network NW. For example, the communication section 61 receives a game stage created by a particular game device 2 and uploaded to the server device 3. Or, in a case where there is a request for downloading a particular game stage from a particular game device 2, the communication section 61 transmits this game stage in response to the request. The uploaded game stage is stored in the high-capacity storage 46 included in the server device 3.

The uncleared game stage management section 62 regards a game stage which has not been cleared yet by any user as "game stage which is not guaranteed as that which can be cleared (uncleared game stage)", and manages this game stage as such. By comparison, the cleared game stage management section 63 regards a game stage which has been cleared by any user as "game stage which is guaranteed as that which can be cleared (cleared game stage)", and manages this game stage as such.

In the game system 1 of the present embodiment, in a case where the game stage created by the user is uploaded to the server device 3, this game stage is treated as an "uncleared game stage", without exception, regardless of whether or not the user has played the game stage before being uploaded, and the uncleared game stage management section 62 manages the game stage as such. In a case where another user who has downloaded the game stage clears the game stage, this game stage is treated as a "cleared game stage," and thereafter the cleared game stage management section 63 manages the game stage as such.

It is determined whether or not the uploaded game stage has been cleared, based on the above stated "clear achievement information" received from the game device 2. A clear flag (one of status flags) is set in each game stage to identify whether the game stage managed by the server device 3 is the uncleared game stage or the cleared game stage. When the game stage is the uncleared game stage (when the clear achievement information of the game stage has not been received), the corresponding clear flag is OFF. On the other hand, when the game stage is the cleared game stage (when the clear achievement information of the game stage has been received), the corresponding clear flag is ON. Therefore, it is determined whether the clear flag is ON or OFF, and thereby it is determined whether or not the corresponding game stage has been cleared.

The ranking management section 64 ranks game stages or users who played the same game stage, according to use states of the uploaded game stages. The ranking management section 64 does not rank the uncleared game stages, but ranks only the cleared game stages. Ranking of the game stages may be such that the game stage downloaded many times from the server device 3 to the game devices 2 is a higher ranking, the game stage having been cleared many times is a higher ranking, and the game stage having a higher point in numerical representation which is the user's evaluation, is a higher ranking. A creator (user) who creates the game stage would like the created game stage to be a ranking target, which urges the user to attempt to create the game stage which can be cleared. As a result, it becomes possible to suppress a situation in which many game stages which cannot be cleared are uploaded. Ranking of users may be such that the user who has cleared the same game stage in a shorter time is a higher ranking.

The reward providing section 65 provides a predetermined reward to a user who has downloaded an uncleared game stage, executed test play of the uncleared game stage, and cleared the uncleared game stage for the first time. The reward providing section 65 determines whether or not the uncleared game stage has been cleared, by comparing ID information and clear achievement information of the cleared game stage which are received from the game device 2, to the uncleared game stages managed by the uncleared game stage management section 62. That is, when the ID information of the cleared game stage is included in ID information of the game stages managed as uncleared game stages, it can be determined that the uncleared game stage has been cleared for the first time. Therefore, the reward providing section 65 provides a reward to the game device 2 which transmits the clear achievement information of the cleared game stage.

The reward may be money which can be used to buy item(s), arming components, etc., in the middle of the present game, specified item(s), honor, etc. For example, predetermined money may be paid to the user who has cleared the game stage. More money may be paid in a case where the uncleared game stage has been cleared than in a case where the cleared game stage has been cleared. This urges the user to attempt to execute test play of the uncleared game stage. Therefore, it becomes possible to suppress a situation in which the game stages which can be cleared fundamentally are left as the uncleared game stages for a long time. As a result, it can be expected that many users will play the uncleared game stage as the game stages which can be cleared.

The functions implemented by the communication section 61, the uncleared game stage management section 62, the cleared game stage management section 63, the ranking management section 64, the reward providing section 65, etc., in the server device 3 as described above, constitute an example of steps of the control method of the server device 3 in execution of the present game. As corresponding to the sections 61 to 65, the steps may include a communication step, an uncleared game stage management step, a cleared game stage management step, a ranking management step, and a reward providing step.

[Processing Flow of Game System]

Figure 5:
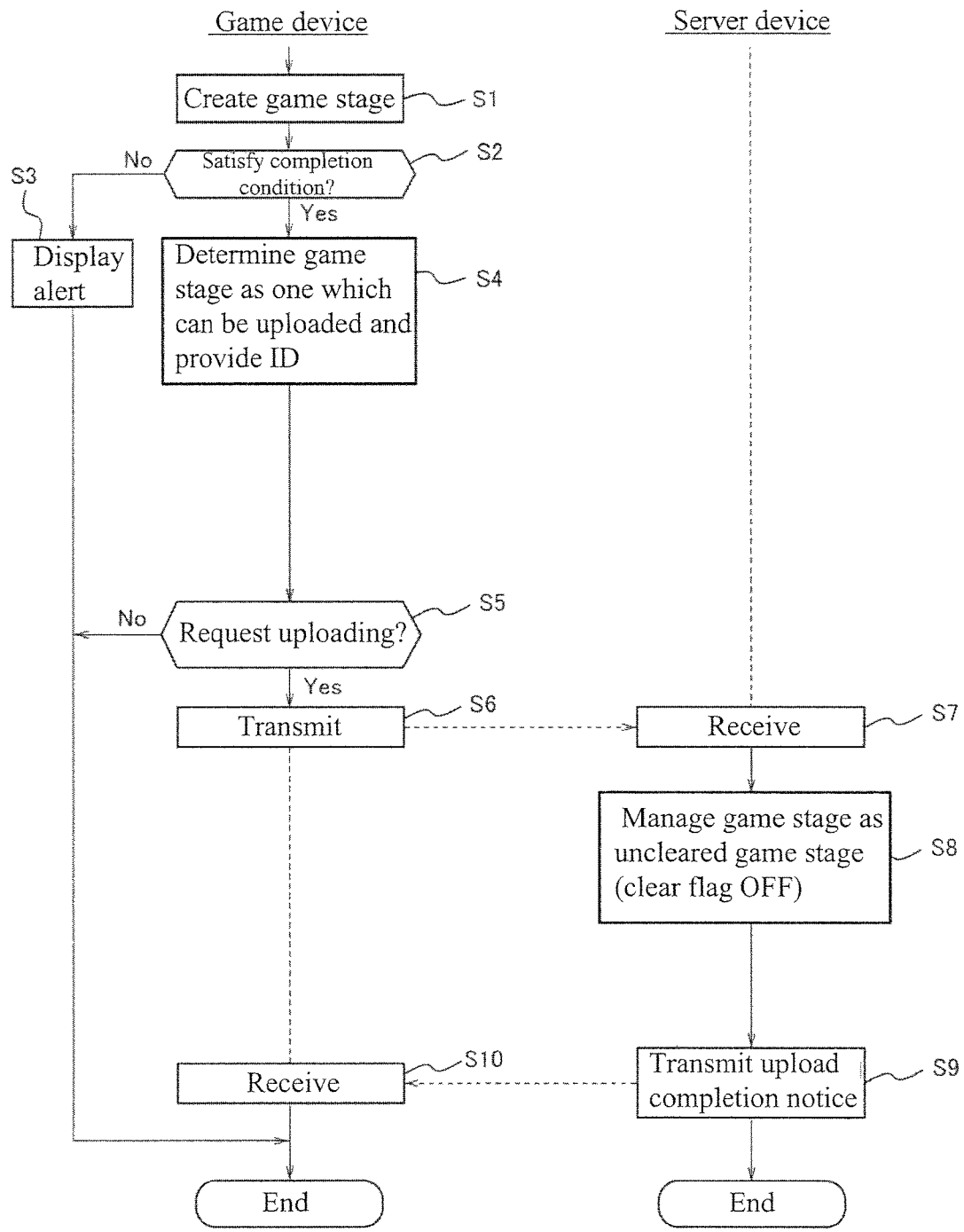
FIG. 5 is a flowchart showing an operation of the game system from an operation for creating the game stage to an operation for managing the game stage.

Next, a flow of each operation executed in the game system 1 as described above will be described. FIG. 5 is a flowchart showing an operation of the game system 1 from an operation for creating the game stage using the game device 2 to an operation for managing the game stage in the server device 3. As shown in FIG. 5, when the user creates the game stage using the game device 2 (step S1), it is determined whether or not the game stage satisfies a predetermined completion condition (step S2). In the present embodiment, the predetermined completion condition is such that the game stage includes at least the start point Ps and the goal point Pg.

If it is determined that the game stage does not satisfy the predetermined completion condition (step S2: NO), the monitor 19 displays alert information indicating that the game stage does not satisfy the predetermined completion condition (step S3), and a series of processing of FIG. 5 is ended. On the other hand, if it is determined that the game stage satisfies the predetermined completion condition (step S2: YES), the game stage is regarded as the game stage which can be uploaded to the server device 3, and unique ID information (hereinafter will be referred to as "stage ID") is provided to the game stage (step S4). Then, it is determined whether or not the user has performed a predetermined manipulation inputting to upload this game stage to the server device 3 (step S5).

If it is determined that the user has not performed the predetermined manipulation inputting to request uploading (step S5: NO) in the determination in step S5, the series of processing of FIG. 5 is ended. On the other hand, if it is determined that the user has performed the predetermined manipulation inputting to request uploading (step S5: YES), the game device 2 uploads (transmits) the game stage created in step S1 to the server device 3 (step S6). In step S6, the game device 2 transmits at least data associated with the game stage, the unique stage ID provided to the game stage in step S4, and information (hereinafter will be referred to as "user ID") used to identify the user who has created the game stage (or game device 2 used to create the game stage).

The server device 3 receives the data of the game stage, the stage ID, the user ID, etc. (step S7). The server device 3 stores this game stage in the high-capacity storage 46 and manages this game stage as an "uncleared game stage" (step S8). Specifically, the server device 3 associates the data of the game stage, the stage ID, and the user ID which have been received, with each other, and associates these data with the clear flag "OFF". In this way, the server device 3 manages the game stage corresponding to the clear flag "OFF" as the uncleared game stage. Then, the server device 3 notifies that uploading of the game stage is completed appropriately (step S9). Then, the game device 2 receives this notice and displays this notice on the monitor 19 (step S10), and the above stated series of flow is ended.

If it is determined that the user has not performed the predetermined manipulation inputting to request uploading (step S5: NO), and thus, the present processing is ended, the user can upload the game stage to the server device 3 by another manipulation on the game device 2 another time. Although step S5 for determining whether or not the created game stage is to be uploaded is performed as described above, step S5 may be omitted. For example, when the game stage which can be uploaded is created (step S4), this game stage may be uploaded automatically to the server device 3 (step S6).

Figure 6:
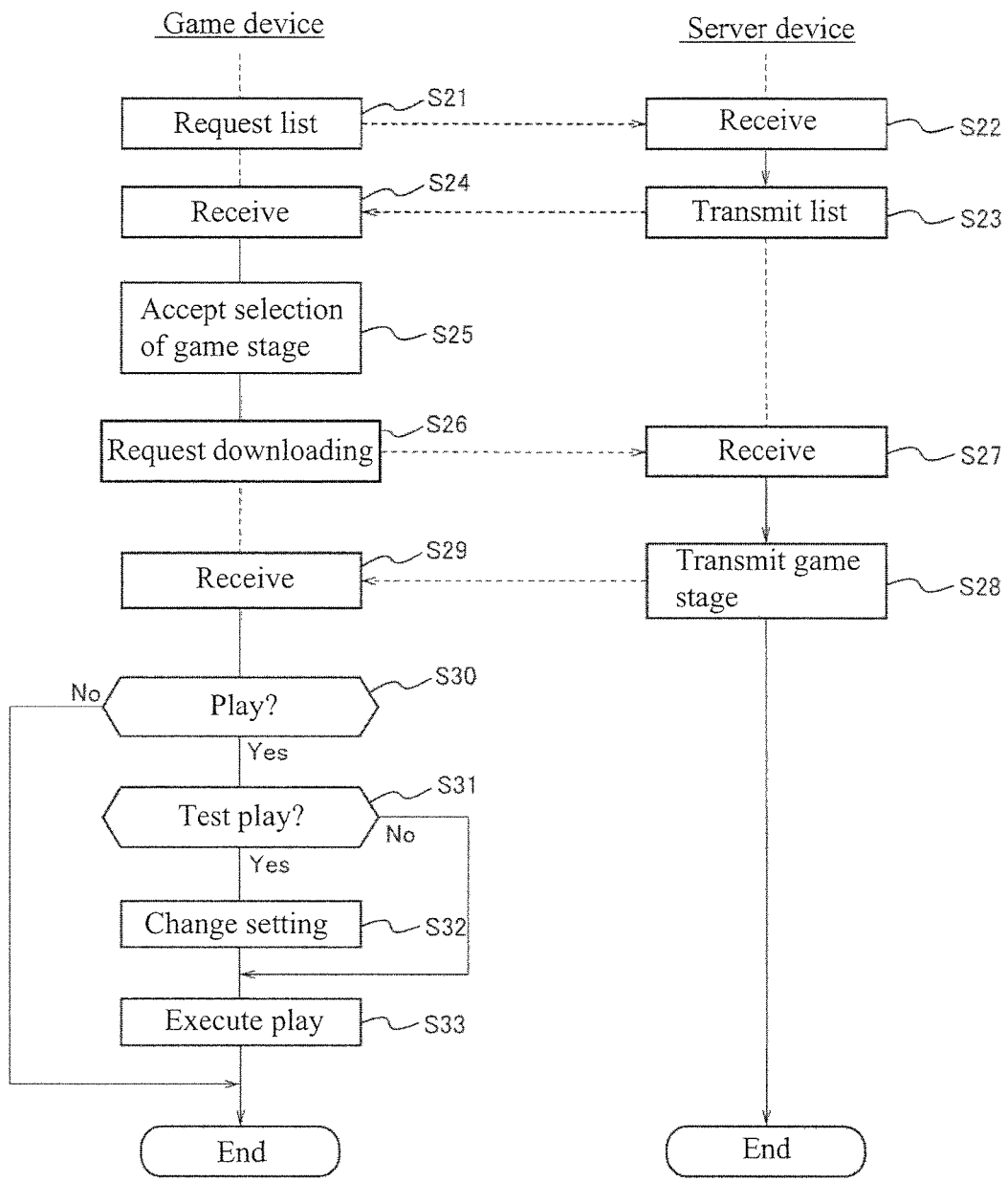
FIG. 6 is a flowchart showing an operation of the game system which occurs in a case where the game stage is downloaded and played.

FIG. 6 is a flowchart showing the operation of the game system 1 which occurs in a case where the game stage uploaded to the server device 3 is selected, downloaded to the game device 2 and played in the game device 2. As shown in FIG. 6, the game device 2 is able to transmit a signal for requesting a list of the uploaded game stages, to the server device 3 (step S21). When the server device 3 receives this request signal (step S22), it creates a list of the game stages stored in the high-capacity storage 46 at that point of time, and transmits the list to the game device 2 (step S23).

This list includes the uncleared game stages and the cleared game stages which are sorted out such that the uncleared game stages and the cleared game stages are distinguished from each other. Alternatively, the list may include information such as names of game stages, names (user IDs) of users who created the game stages, the number of times of downloading in the past, the number of times of clear in the past, comments made by creators, etc. These pieces of information are associated with the stage IDs of the respective game stages.

When the game device 2 receives the list from the server device 3 (step S24), it displays the list on the monitor 19. The game device 2 accepts selection of any one of the game stages by the user's predetermined manipulation (step S25). Alternatively, the game device 2 may accept selection of two or more of the game stages.

The game device 2 transmits a signal indicating a request for downloading data of the game stage accepted in step S25, to the server device 3 (step S26). Preferably, this signal contains at least the stage ID affixed to the game stage to identify the game stage. When the server device 3 receives this signal (step S27), it identifies the game stage based on the stage ID, and transmits the data to the game device 2 (step S28).

When the game device 2 receives the data (step S29), it stores the data in the HDD14 and determines whether or not to play the game stage, in response to the user's manipulation (step S30). If it is determined that the user has not performed a manipulation to play this game stage (step S30: NO), the present processing is ended. On the other hand, if it is determined that the user has performed the manipulation to play this game stage (step S30: YES), the game device 2 determines whether or not the present play is "test play."

In a case where this game stage is the uncleared game stage, the game device 2 determines that the present play is "test play" (step S31: YES) and changes the setting of the game stage to preset conditions for the test play (step S32). For example, regardless of a setting content at a time point when the game stage was created, the game device 2 newly sets the status of the enemy character C2 such as the offensive power and the defensive power, to normal levels (numeric values which are near median values in a numeric value range which can be set by the user at the time of creation). In addition, the game device 2 may newly set the status of the player character C1 to normal levels, or newly set initial arming components or items owned by the player character C1 to specified ones. After the game device 2 changes the setting for the test play (step S32), or determines that the present play is not the "test play" in step S31 (step S31: NO), the game device 2 executes play of the game stage (step S33), and the present processing is ended.

Although the server device 3 transmits the list including the uncleared game stages and the cleared game stages to the game device 2 (step S23) in response to the request of the list from the game device 2 (step S21) as described above, the present invention is not limited to this. For example, the server device 3 may transmit (provide) either the list of the uncleared game stages or the list of the cleared game stages, to the game device 2. In this case, in the game device 2, the user is caused to select either the list of the uncleared game stages or the list of the cleared game stages, in advance. Then, the game device 2 requests the selected list to the server device 3 (step S21). The server device 3 transmits the requested list of the game stages to the game device 2.

Figure 7:
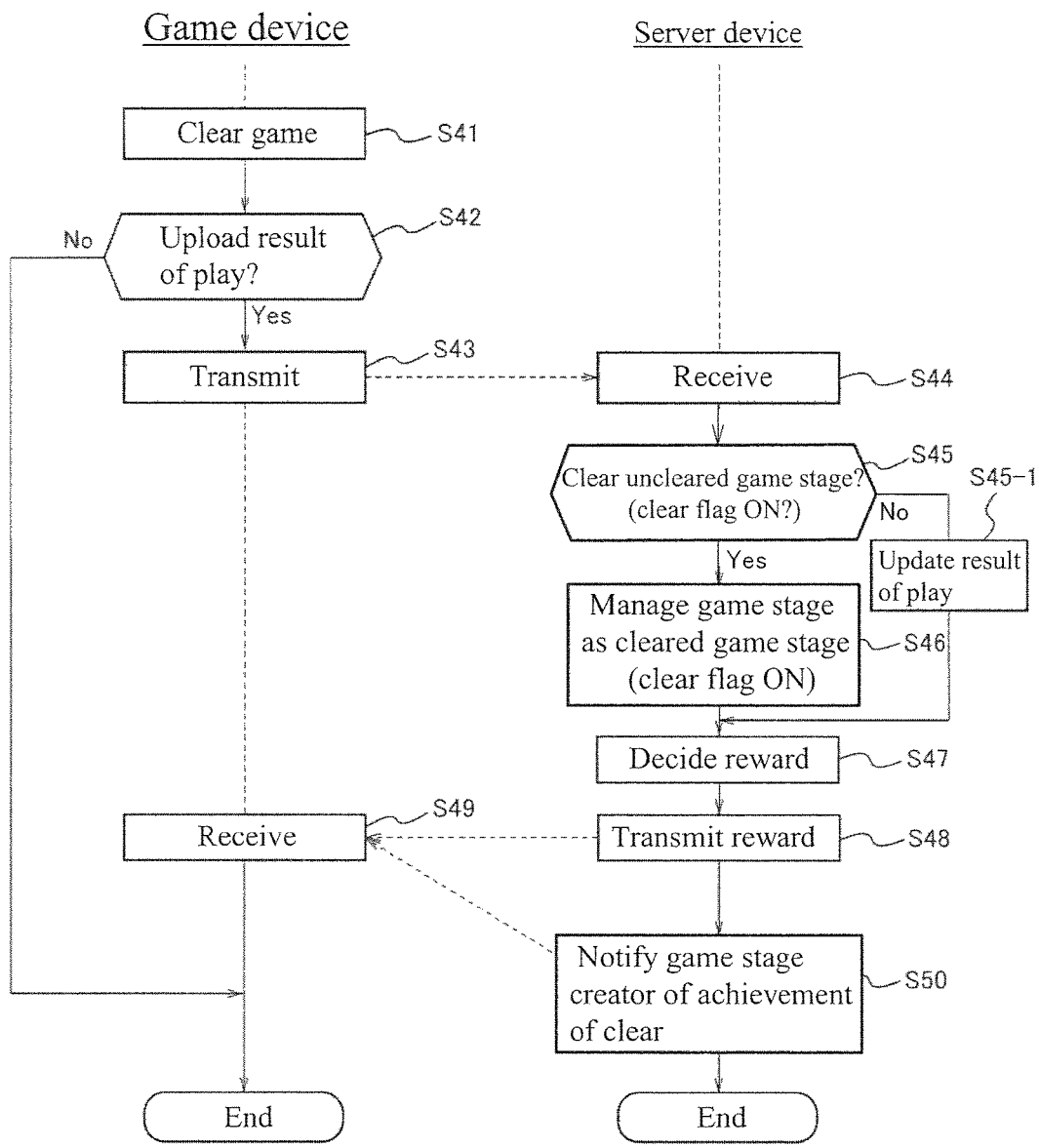
FIG. 7 is a flowchart showing an operation of the game system in a case where the game stage is cleared.

FIG. 7 is a flowchart showing an operation of the game system 1 in a case where the game stage is cleared in the game device 2. As shown in FIG. 7, when the player character C1 reaches the goal point Pg and thereby the game stage is cleared (step S41), the game device 2 determines whether or not to upload a result of the play relating to the game stage, to the server device 3, in response to the user's manipulation (step S42). If it is determined that the result of the play relating to the game stage should not be uploaded (step S42: NO), the present processing is ended. On the other hand, if it is determined that the result of the play relating to the game stage should be uploaded (step S42: YES), the game device 2 transmits the result of the play to the server device 3 (step S43).

The result of the play transmitted in step S43 preferably includes the stage ID relating to the cleared game stage, the user ID relating to the player who has cleared the game stage, and clear achievement information indicating that the game stage has been cleared.

When the server device 3 receives the result of the play (step S44), the server device 3 determines whether or not the uncleared game stage has been cleared based on the information (especially, stage ID) included in the result of the play (step S45). Specifically, the server device 3 identifies the cleared game stage from the information included in the result of the play, and identifies the clear flag associated with the cleared game stage. When the clear flag is ON, the server device 3 determines that the cleared game stage has been cleared (step S45: NO), and updates the result of the play (e.g., time required to clear the game stage, ranking based on a time length of clear, etc.,) (step S45-1). On the other hand, when the clear flag is OFF, the server device 3 determines that the uncleared game stage has been cleared (step S45: YES).

If it is determined that the uncleared game stage has been cleared (step S45: YES), the server device 3 changes this game stage from the uncleared game stage to the cleared game stage and manages it as such (step S46). In other words, the server device 3 changes the clear flag of this game stage from OFF to ON. Then, the server device 3 decides a reward to both of a case where the uncleared game stage has been cleared and a case where the cleared game stage has been cleared (step S47). This reward is set so that a higher value is paid to the case where the uncleared game stage has been cleared than to the case where the cleared game stage has been cleared.

Alternatively, the reward may be paid to only the case where the uncleared game stage has been cleared, and may not be paid to the case where the cleared game stage has been cleared. In this case, if it is determined that the cleared game stage has been cleared in step S45 (step S45: NO), the server device 3 updates the result of the play (step S45-1), and the present processing is ended, without moving to step S47.

When the server device 3 decides the reward (step S47), it transmits the reward to the game device 2 (step S48), and the game device 2 receives the reward (step S49). In the case where the uncleared game stage has been cleared, at a time point when the server device 3 has become able to communicate with the game device 2 which is used by the creator of the game stage (e.g., when the game device 2 logs-in the server device 3), it notifies that the uncleared game stage has been cleared (step S50). In the present embodiment, only the cleared game stage is the ranking target. Therefore, at a time point when the uncleared game stage has been cleared as described above, this game stage is also regarded as the ranking target. For example, if it is determined that the uncleared game stage has not been cleared (the cleared game stage has been cleared) (step S45: NO) as described above, the server device 3 updates ranking information relating to the game stage (cleared game stage) based on the clear time or the like, of this user (step S45-1).

The information transmitted from the game device 2 to the server device 3 in step S43 when the game stage has been cleared may include the user's evaluation of the game stage. For example, when the game stage is cleared, choices such as "GOOD" and "BAD" are displayed on the monitor 19 of the game device 2, and the user is allowed to select "GOOD" or "BAD" as an evaluation of the game stage. The game device 2 transmits the information indicating the selected evaluation to the server device 3 together with the information indicating the result of the play. Then, the server device 3 may rank the game stage or its creator (step S45-1) based on the received evaluation as one indicator. In this case, a particular honor (e.g., "creator") may be given to a user of a higher ranking.

Alternatively, the uncleared game stage may be managed as associated with the user name (user ID) of the user who has cleared the uncleared game stage, and the user may be ranked based on the number of game stages having been cleared, as an indicator. A particular honor (e.g., deliverer) may be given to a user of a higher ranking who has cleared many game stages.

In the present embodiment, the user (creator) who has uploaded the game stage can download this game stage created by the user from the server device 3 and play this game stage. However, downloading of the game stage by the creator may be limited. Or, when the creator downloads and clears the game stage created by the creator, it may be decided that the reward is not provided to the creator in step S47.

The uncleared game stage management section 62 of the server device 3 may terminate management of the uncleared game stage in a case where a predetermined condition is satisfied in a state in which the uncleared game stage remains uncleared. For example, the server device 3 may include a time measuring means, and may delete data of the uncleared game stage from the server device 3, when predetermined time passes after the uncleared game stage has been uploaded. Or, the uncleared game stage management section 62 of the server device 3 may manage the number of times of downloading performed by the user(s) and may delete data of the uncleared game stage from the server device 3, when the number of times of downloading of the uncleared game stage reaches a predetermined value. Or, the uncleared game stage management section 62 of the server device 3 may preset the number of uncleared game stages which can be stored (managed) in the server device 3, and may delete the uncleared game stages such that the order of deletion is from old to recent in time of storage, if requests for uploading, which are more than the preset number, are made.

In accordance with the game system 1 as described above, the user can upload the game created by the user to the server device 3, regardless of whether or not the created game stage can be cleared. The server device 3 manages the uploaded game stages as the uncleared game stages and the cleared game stages such that the uncleared game stages and the cleared game stages are distinguished from each other. Therefore, another user can select which of the uncleared game stage and the cleared game stage is played.

The reward of a higher value is paid to the user in the case where the user clears the uncleared game stage in test play than in the case where the user clears the cleared game stage. This urges the user to attempt to play the uncleared game stage. Therefore, it becomes possible to prevent a situation in which the game stages which can be fundamentally cleared are left as uncleared game stages in the server device 3. In addition, in the case where the predetermined condition is satisfied in the state in which the uncleared game stage remains uncleared, the server device 3 deletes the uncleared game stage, etc., and terminates management of the uncleared game stage. Therefore, it also becomes possible to prevent a situation in which the game stages which can be fundamentally cleared are left as uncleared game stages in the server device 3. Moreover, a storage capacity of the game stages of the server device 3 can be reduced.

As described previously, since only the cleared game stage is set as the ranking target, the user is urged to create the game stage which can be cleared. Therefore, it becomes possible to prevent a situation in which many game stages which cannot be cleared are uploaded to the server device 3. In a case where the challenge (difficulty) level (e.g., hard, normal, easy, etc.) can be changed by the user when the cleared game stage is played, only the cases where the game stage is played with challenge (difficulty) levels of hard and normal may be regarded as a ranking target.

In accordance with the game system 1 so configured, only the game stages which can be cleared are left in the cleared game stage management section 63, and in other words, good game stages are managed by the cleared game stage management section 63. On the other hand, there is a possibility that the game stages which cannot be cleared by any users exist in the uncleared game stage management section 62. However, there is a possibility that the uncleared game stages in the uncleared game stage management section 62 may include, for example, the game stage of a higher challenge (difficulty) level which cannot be cleared by the creator but can be cleared only by another user with a high play skill. That is, there is a possibility that the game stage with a challenge (difficulty) level higher than that of the cleared game stage may be managed as the uncleared game stage in the uncleared game stage management section 62.

Since the cleared game stages do not include a bad game stage which cannot be cleared by any users, the user who downloads the game stage can play the game stage non-stressfully without wondering if the downloaded game stage is the game stage which can be fundamentally cleared. Even if the cleared game stage cannot be cleared, the user can be aware that the user is incapable of clearing the game stage, due to the user's low play skill. For this reason, it is possible to prevent a situation in which it is misunderstood that failure to clear the game stage is due to a configuration of the game stage, and as a result, the user would not like to play the game in the future. And, the user is urged to play the game repetitively to enhance the user's play skill.

Furthermore, it becomes also possible to prevent a situation in which in a case where the user cannot clear the game stage which can be fundamentally cleared due to the user's low play skill, bad evaluation (the above mentioned "BAD") is given to the creator of the game stage, by mistake. As described above, in a case where the uncleared game stage is downloaded and cleared, a predetermined reward is provided to the user and the user name (user ID) of the user who has cleared the game stage is managed and used as an indicator of ranking. This urges the user with a high play skill to make a challenge to actively select and clear the uncleared game stage.

As should be understood from above, in accordance with the game system 1, new community can be created between the creator of the game stage and another user who plays this game stage, via the game stage, without causing any stress. As a result, it is possible to provide a game which attracts the user's interest and the user does not get tired of, even after the game is played many times.

Embodiment 2

The game system 1 of Embodiment 1 is configured in such a manner that the game stage created by the user and uploaded to the server device 3 is managed as the uncleared game stage by the server device 3 without exception (see step S8 in FIG. 5). However, the configuration of the game system 1 is not limited to this. For example, before the game stage is uploaded, the user who has created the game stage may play this game stage, and the server device 3 may manage the game stage as the uncleared game stage or the cleared game stage, according to a result of the play. In Embodiment 2, such a game system 1 will be described.

Figure 8:
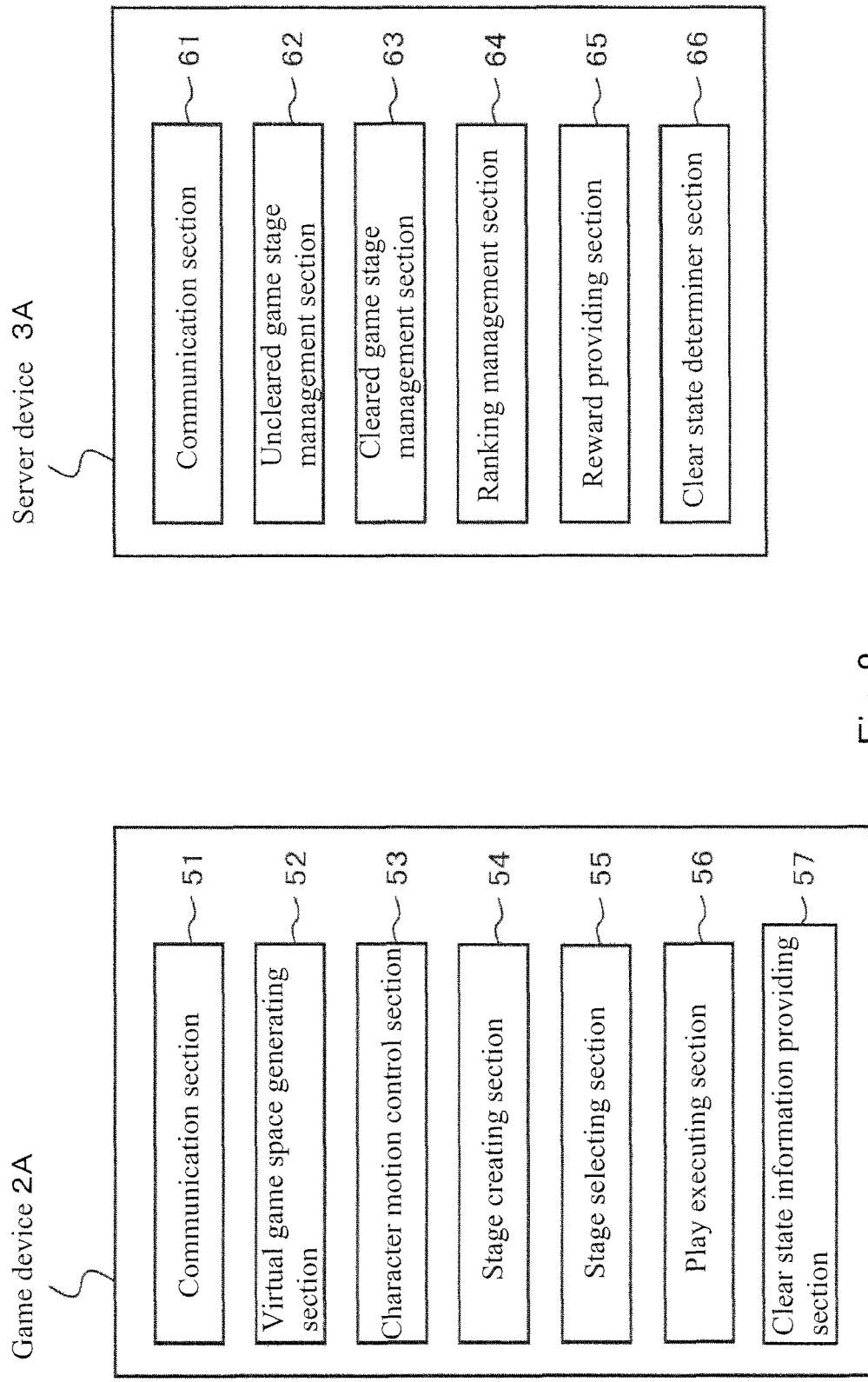
FIG. 8 is a block diagram showing a functional configuration of a game device and a functional configuration of a server device according to Embodiment 2.

FIG. 8 is a block diagram showing a functional configuration of a game device 2A and a functional configuration of a server device 3A in the game system 1 according to Embodiment 2. The hardware configuration of the game device 2A and the hardware configuration of the server device 3A are similar to that of the game device 2 and that of the server device 3 of FIG. 3, respectively. As shown in FIG. 8, the game device 2A includes a clear state information providing section (clear state information providing module, clear state information providing means) 57, in addition to the communication section 51, the virtual game space generating section 52, the character motion control section 53, the game stage creating section 54, the game stage selecting section 55, and the play executing section 56, which are similar to those of the game device 2 of Embodiment 1.

The clear state information providing section 57 provides the game stage created by the user with clear state information indicating whether or not the game stage has been played and cleared by the user before this game stage is managed by the server device 3. For example, in the game device 2A, a clear flag is set in the cleared game stage. In a case where the game stage has been played in test play and cleared before this game stage is uploaded to the server device 3, the clear flag is set to ON. On the other hand, in a case where the game stage has not been cleared before this game stage is uploaded to the server device 3, the clear flag is set to OFF. This clear state information (i.e., clear flag) is associated with the game stage and uploaded to the server device 3, together with the game stage.

As shown in FIG. 8, the server device 3A of Embodiment 2 includes a clear state determiner section (clear state determination module, clear state determination means) 66, in addition to the communication section 61, the uncleared game stage management section 62, the cleared game stage management section 63, the ranking management section 64, and the reward providing section 65, which are similar to those in the server device 3 of Embodiment 1.

The clear state determiner section 66 determines whether or not the uploaded game stage has been cleared, based on the clear state information provided to this game stage. Specifically, when the clear flag indicating the clear state information is ON, the clear state determiner section 66 determines that the game stage has been cleared, while when the clear flag is OFF, the clear state determiner section 66 determines that the game stage is uncleared. The uncleared game stage management section 62 of the server device 3A manages the game stage determined as being uncleared by the clear state determiner section 66, as the uncleared game stage. The cleared game stage management section 63 of the server device 3A manages the game stage determined as having been cleared by the clear state determiner section 66, as the cleared game stage.

The function implemented by the above stated clear state information providing section 57 of the game device 2 and the function implemented by the above stated clear state determiner section 66 of the server device 3 constitute an example of the step of the control method of the game device 2 and an example of the step of the control method of the server device 3 in execution of the present game, respectively. Therefore, these steps may include a clear state information providing step and a clear state determination step corresponding to sections 56 and 57, respectively.

Figure 9:
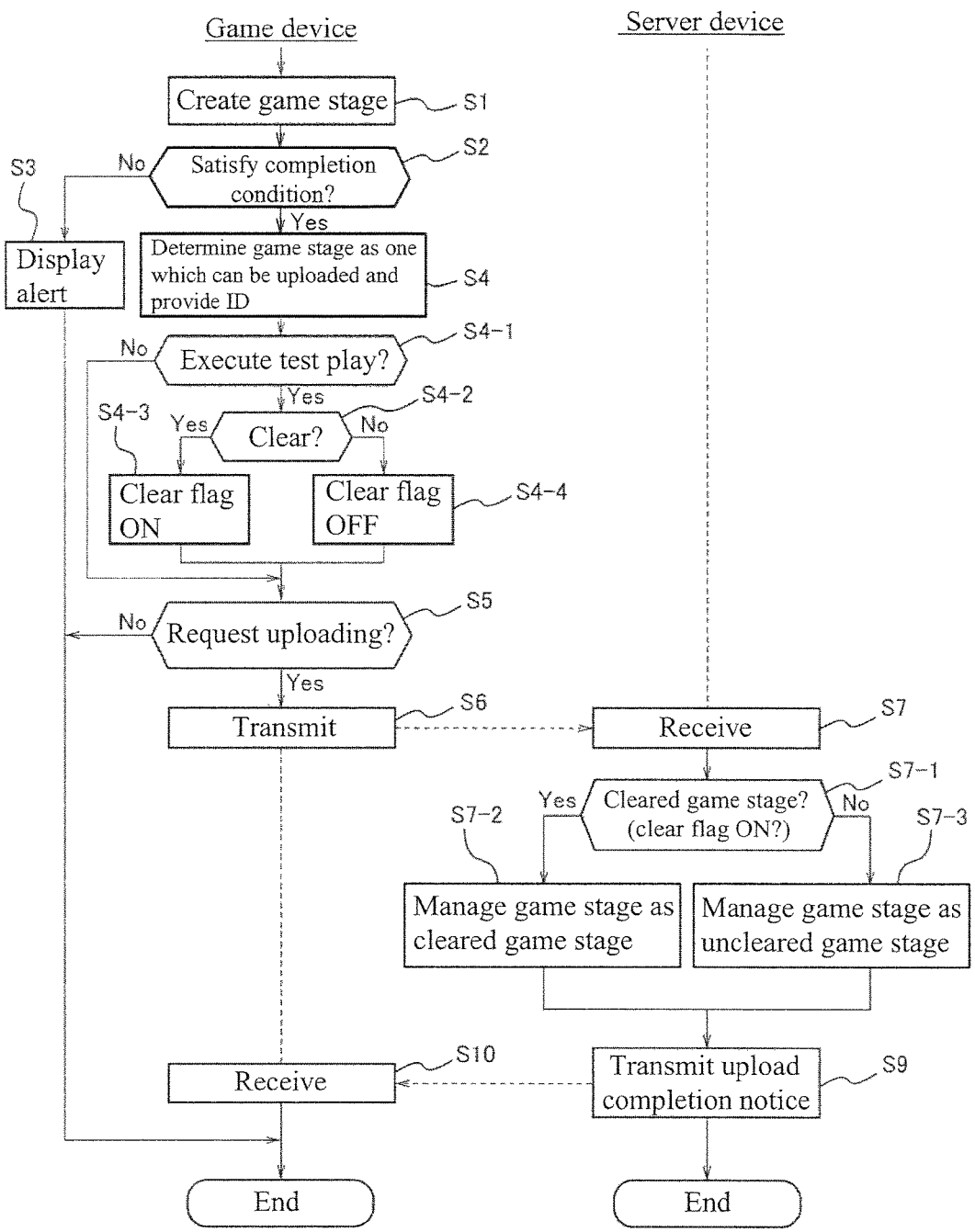
FIG. 9 is a flowchart showing an operation of the game system from an operation for creating the game stage to an operation for managing the game stage according to Embodiment 2.

FIG. 9 is a flowchart showing an operation of the game system 1 from an operation for creating the game stage using the game device 2A to an operation for managing the game stage in the server device 3A in the game system 1 according to Embodiment 2. Since the processing flow of FIG. 9 includes steps (steps S1 to S4, S5 to S7, S9 to S10) similar to those of the processing flow of FIG. 5, these steps are identified by the same step reference symbols, and its detailed description will not be given here (see the corresponding parts in FIG. 5, for detailed description). Hereinafter, the steps in FIG. 9 which are different from the steps of FIG. 5 will be described.

In the processing flow of FIG. 9, steps S4-1 to step S4-4 are inserted between step S4 and step S5. Specifically, when the stage ID is provided to the game stage in step S4, it is determined whether or not the test play has been executed, based on the user's manipulation (step S4-1). If it is determined that the test play has not been executed (step S4-1: NO), the process goes to step S5. On the other hand, if it is determined that the test play has been executed (step S4-1: YES), it is further determined whether or not the game stage has been cleared in the test play (step S4-2). This test play may be executed in a state in which the conditions are newly set to normal levels, as described above in conjunction with step S32 of FIG. 6.

If it is determined that the game stage has been cleared in the test play (step S4-2: YES), the clear state information indicating this is provided to the game stage. Specifically, the clear flag associated with the game stage is set to ON (step S4-3). On the other hand, if it is determined that the game stage has not been cleared in the test play (step S4-2: NO), the clear state information indicating this is provided to the game stage. Specifically, the clear flag associated with the game stage is set to OFF (step S4-4). In Embodiment 2, when the test play is executed, the clear state information corresponding to a result of the test play is provided to the game stage, and then the process moves to step S5.

If it is determined that the test play has not been executed (step S4-1: NO) in the determination as to whether or not the test play has been executed (step S4-1), step S4-1 may be repeated until the test play is executed, without moving to step S5. In this case, a condition in which the test play is executed at least once can be set as an essential condition for uploading the created game stage (step S6).

Alternatively, the creator of the game stage may execute the test play many times before uploading (step S5), and a final state (ON or OFF) of the clear flag may be set based on a result of the test play executed many times. In this case, for example, after the test play is executed once and the state of the clear flag is set (after step S4-3 or S4-4), in the flowchart of FIG. 9, a step (re-execute "test play?") for asking the user about whether or not to re-execute the test play before it is determined whether or not the user requests the uploading (step S5) is added. If it is determined that the user has performed manipulation inputting to re-execute the test play, the step S4-2 and the following steps may be performed after the test play has been re-executed. On the other hand, if it is determined that the user has not performed manipulation inputting to re-execute the test play, the process may move to step S5.

Or, in a case where the game stage is uploaded as the cleared game stage (clear flag is ON), the user who created this game stage may be, for example, rewarded, which is advantageous to the user who created this game stage. For example, special or new object part P which can be acquired only by the user who has uploaded the cleared game stage may be given to the user, or a higher evaluation may be given to the user as the above stated indicator of ranking. Or, a penalty may be imposed on a user who uploads the uncleared game stage. By providing more advantages to the user who uploads the cleared game stage than the user who uploads the uncleared game stage, it can be expected that the creator of the game stage executes test play of the created game stage many times, until the creator can clear the game stage.

When the server device 3A receives the clear state information (clear flag set to ON or OFF) and the game stage from the game device 2A (step S7), it executes steps S7-1~S7-3 instead of step S8 of FIG. 5. Specifically, after step S7, it is determined whether or not the received game stage has been cleared (step S7-1). If the clear flag is ON based the clear state information received from the game device 2A, the server device 3A determines that the received game stage has been cleared (step S7-1: YES), and manages this game stage as the cleared game stage (step S7-2). On the other hand, if the clear flag which is the clear state information is OFF, the server device 3A determines that the received game stage is uncleared (step S7-1: NO), and manages this game stage as the uncleared game stage (step S7-3). Thereafter, like the processing flow of FIG. 5, steps S9 to S10 are performed.

In accordance with the game system 1 according to Embodiment 2, the user who created the game stage executes test play of the game stage. And, if the user can clear the created game stage, the server device 3A manages this game stage as the cleared game stage just after it is uploaded to the server device 3A. This makes it possible to place the uploaded game stage as a ranking target soon, and urge the user to create the game stage which can be cleared. In other words, it becomes possible to suppress a situation in which numerous game stages which cannot be cleared are uploaded to the server device 3A.

To further suppress a situation in which numerous uncleared game stages are uploaded to the server device 3A, in Embodiment 2, a penalty may be imposed on the user in a case where the user uploads the game stage without executing the test play (step S4-1), or a case where the user uploads the game stage which could not be cleared in the test play (step S4-2: NO). The penalty may include, for example, reduction of the money, offering of dishonor, limitation of the number of game stages which are permitted to be uploaded by the user, temporal inhibition of uploading, etc. The penalty may be imposed on the user when even one uncleared game stage is uploaded or when an accumulated number of times of uploading of the uncleared game stages reaches a predetermined number. Moreover, in a case where any user clears the uncleared game stage created by a particular user after the penalty is imposed on the particular user, the penalty imposed on the particular user may be relieved.

In Embodiment 1 and Embodiment 2, the challenge (difficulty) level may be made different between the case where the particular user executes the test play of the game stage created by the particular user and the case where another user executes the test play of the game stage. For example, the challenge (difficulty) level may be newly set lower (or higher) when the former user executes the test play, while the challenge (difficulty) level may be newly set higher (or lower) when the latter user executes the test play.

The reward provided to the user when the uncleared game stage has been cleared may be varied according to the challenge (difficulty) level of the uncleared game stage. For example, the server device 3, 3A manages the number of times each uncleared game stage is downloaded. If a game stage remains managed as the uncleared game stage even though this game stage was downloaded many times, this uncleared game stage can be evaluated as having a high challenge (difficulty) level. Therefore, a reward of a higher value may be provided to the user who clears the uncleared game stage which was downloaded many times.

Although one server device 3 (or server device 3A) manages the uncleared game stages and the cleared game stages as described above, the present invention is not limited to this. For example, separate server devices may manage the uncleared game stages and the cleared game stages. The challenge (difficulty) level of the game stage for the test play may be newly set in such a manner a time limit within which the game stage is cleared may be changed in a case where the limit time is set, in addition to the above described manner.

In Embodiment 1 and Embodiment 2, a portion of the means illustrated as those of the game device 2, 2A may be incorporated into the server device 3, 3A. Or, a portion of the means illustrated as those of the server device 3, 3A may be incorporated into the game device 2, 2A. For example, in Embodiment 1, the game device 2 may provide the information (clear flag) relating to the clear state to the created game stage, and upload the game stage with the clear flag to the server device 3. Or, in a case where the downloaded uncleared game stage is cleared, the game device 2, 2A rewrites the uncleared game stage (clear flag OFF) to the cleared game stage (clear flag ON), and uploads the cleared game stage to the server device 3, 3A.

Or, the game device 2, 2A may execute the process (step S45-1 in FIG. 7) for updating the ranking and upload the updated information to the server device 3, 3A. Or, the game device 2, 2A may execute the process (step S47 in FIG. 7) for deciding the reward when the game stage has been cleared, and download the decided reward from the server device 3, 3A. Or, the game device 2, 2A which has cleared the game stage may execute the process (step S50 in FIG. 7) for notifying the creator who created the game stage that the game stage has been cleared. Or, the server device 3, 3A may be configured to perform only management of the game stages and transmission/reception of stage data to/from the game device 2, 2A.

INDUSTRIAL APPLICABILITY

The present invention is applicable to a game system, a game program, and a computer device, which allow another user(s) to play a game stage created by a particular user.

REFERENCE CHARACTERS LIST 1 game system
2, 2A game device (computer device)
3, 3A server device (computer device)
30a, 42a game program
30b, 42b game data
51 communication section (communication means)
54 game stage creating section (game stage creating means)
55 game stage selecting section (game stage selecting means)
56 play executing section (play executing means, test play executing means)
57 clear state information providing section (clear state information providing means)
61 communication section (communication means)
62 uncleared game stage management section (uncleared game stage management means)
63 cleared game stage management section (cleared game stage management means)
64 ranking management section (ranking management means)
65 reward providing section (reward providing means)

The invention claimed is:
1. A game system including a plurality of computer devices which are communicable with each other via a communication means, the game system comprising:
a first client device including a first client device processor, a second client device including a second client device processor, and a server device including a server device processor and a memory, wherein the first client device processor is configured to execute:
   a game stage creating module for creating a game stage in response to a first user's manipulation,
   wherein in a case where the game stage created in response to the first user's manipulation has been cleared in test play of the first user, the first client device processor transmits to the server device the created game stage as a cleared game stage which is guaranteed as a game stage which can be cleared, in response to the first user's request for uploading,
   wherein in a case where the game stage created in response to the first user's manipulation has not been cleared in test play of the first user, the first client device processor transmits to the server device the created game stage as an uncleared game stage which is not guaranteed as the game stage which can be cleared, in response to the first user's request for uploading;
wherein the server device processor is configured to execute:
   an uncleared game stage management module for storing in the memory the uncleared game stage transmitted from the first client device;
wherein the second client device processor is configured to execute:
   a test play executing module for executing test play of the uncleared game stage in response to a second user's manipulation, the second user being different than the first user; and
wherein the server device processor is configured to execute:
   a reward providing module for providing a predetermined reward to the second user who has cleared the uncleared game stage in test play; and
   a cleared game stage management module for storing in the memory the cleared game stage transmitted from the first client device and storing in the memory the uncleared game stage having been cleared in test play of the second user as the cleared game stage;
wherein the uncleared game stage management module is configured to delete the uncleared game stage from the memory when a predetermined condition is satisfied in a state in which the uncleared game stage remains uncleared by the second user, the predetermined condition including a time limit, a number of downloads by users, or a preset number of slots for uncleared game stages with a first in first out termination logic.

2. The game system according to claim 1, the first client device processor further configured to execute:
a clear state information providing module for providing the game stage with clear state information indicating whether or not the game stage has been cleared by a user who created the game stage before the game stage is managed by the uncleared game stage management module or the cleared game stage management module;
wherein the uncleared game stage management module manages the game stage as the uncleared game stage when the clear state information indicates that the game stage is uncleared; and
wherein the cleared game stage management module manages the game stage as the cleared game stage when the clear state information indicates that the game stage has been cleared.

3. The game system according to claim 1, the server device processor further configured to execute:
- a ranking management module for managing ranking of the game stage according to a use state of the game stage;
- wherein the ranking management module is configured to rank the cleared game stage among game stages.

4. A method of controlling a computer device, comprising the steps of:
- transmitting/receiving data to/from another computer device;
- storing in memory a first created game stage as a first cleared game stage which is guaranteed as a game stage which can be cleared, when the first created game stage is received from the another computer device;
- storing in memory a second created game stage as an uncleared game stage which is not guaranteed as a game stage which can be cleared, when the second created game stage is received from the another computer device;
- storing in the memory the uncleared game stage as a second cleared game stage which is guaranteed as a game stage which can be cleared, when clear achievement information indicating that the uncleared game stage has been cleared is received from a different computer device separate from the another computer device; and
- providing a predetermined reward to a user who has cleared the uncleared game stage in test play,
- wherein the uncleared game stage is deleted from the memory when a predetermined condition is satisfied in a state in which the uncleared game stage remains uncleared, the predetermined condition including a time limit, a number of downloads by users, or a preset number of slots for uncleared game stages with a first in first out termination logic.

5. The method of controlling the computer device according to claim 4, wherein:
- when the second created game stage is received from the another computer device,
- the second created game stage provided with clear state information indicating that the second created game stage is uncleared, is managed as the uncleared game stage, in the step of storing in the memory the second created game stage as the uncleared game stage; and
- the game stage provided with clear state information indicating that the second created game stage has been cleared, is managed as the second cleared game stage, in the step of storing in the memory the uncleared game stage as the second cleared game stage.

6. The method of controlling the computer device according to claim 4, further comprising:
- managing ranking of the second created game stage according to a use state of the second created game stage;
- wherein in the step of managing ranking of the second created game stage, the second cleared game stage, among game stages, is ranked.

7. A non-transitory storage medium which is computer-device-readable, and contains commands executed by a control section in the computer device, the commands causing the computer device to execute the steps of:
- transmitting/receiving data to/from another computer device;
- storing in memory a first created game stage as a first cleared game stage which is guaranteed as a game stage which can be cleared, when the first created game stage is received from the another computer device;
- storing in memory a second created game stage as an uncleared game stage which is not guaranteed as a game stage which can be cleared, when the second created game stage is received from the another computer device;
- storing in the memory the uncleared game stage as a second cleared game stage which is guaranteed as a game stage which can be cleared, when clear achievement information indicating that the uncleared game stage has been cleared is received from a different computer device separate from the another computer device; and
- providing a predetermined reward to a user who has cleared the uncleared game stage in test play,
- wherein the uncleared game stage is deleted from the memory when a predetermined condition is satisfied in a state in which the uncleared game stage remains uncleared, the predetermined condition including a time limit, a number of downloads by users, or a preset number of slots for uncleared game stages with a first in first out termination logic.

8. The non-transitory storage device which contains the commands according to claim 7, wherein:
- when the second created game stage is received from the another computer device,
- the second created game stage provided with clear state information indicating that the game stage is uncleared, is stored in the memory as the uncleared game stage, in the step of storing in the memory the second created game stage as the uncleared game stage; and
- the second created game stage provided with clear state information indicating that the second created game stage has been cleared, is stored in the memory as the cleared game stage, in the step of storing in the memory the uncleared game stage as the cleared game stage.

9. The non-transitory storage device which contains the commands according to claim 7, the commands further causing the computer device to execute the step of:
- managing ranking of the second created game stage according to a use state of the second created game stage;
- wherein in the step of managing ranking of the second created game stage, the second cleared game stage, among game stages, is ranked.

* * * * *